United States Patent [19]
Lindsay

[11] Patent Number: 5,042,575
[45] Date of Patent: Aug. 27, 1991

[54] EVAPORATOR CORE HAVING BIOCIDAL FIXTURE

[75] Inventor: James H. Lindsay, Fenton, Mich.

[73] Assignee: General Motors Corporation, Detroit, Mich.

[21] Appl. No.: 572,649

[22] Filed: Aug. 27, 1990

[51] Int. Cl.$^5$ ............................................. F28F 19/00
[52] U.S. Cl. ................................... 165/134.1; 165/133
[58] Field of Search ............................. 165/133, 134.1

[56] References Cited

U.S. PATENT DOCUMENTS

| | | | |
|---|---|---|---|
| 4,355,636 | 10/1982 | Oetjen et al. | 165/133 X |
| 4,395,313 | 7/1983 | Lindsay et al. | 204/30 |
| 4,830,101 | 5/1989 | Ohara et al. | 165/133 |

FOREIGN PATENT DOCUMENTS 55-23857  2/1980  Japan ................................ 165/134.1

OTHER PUBLICATIONS

U.S. Serial No. 360,681 filed by Siak et al., on Jun. 2, 1989.
Lindsay et al. "Vacuum Preplate Process for Plating on Acrylonitrile-Butadiene-Styrene (ABS)", *Plating and Surface Finishing*, Jul. 1985, pp. 54–59.
Lowemheim, *Electroplating*, McGraw-Hill, New York, NY (1978), pp. 404–408.
Uhlig, *Corrosion Handbook*, Wiley & Sons, New York, NY (1948), pp. 53, 67–68.
Wernick et al., *The Surface Treatment and Finishing of Aluminum and Its Alloy*, vol. 1, ASM International, Metals Park, OH (1987), pp. $8 \geq 23$.

*Primary Examiner*—Allen J. Flanigan
*Attorney, Agent, or Firm*—Douglas D. Fekete

[57] ABSTRACT

In a preferred embodiment of the invention, an evaporator core for an automotive air conditioning system or the like comprises a brazed plate-and-fin heat exchanger formed of aluminum alloy and having air passages opening at an upstream face. The evaporator core further comprises a biocidal fixture attached to the heat exchanger upstream face. The fixture comprises a carrier formed of an electrically nonconductive polymer and metallic copper plate deposited on the surface of the carrier spaced apart from the heat exchanger. During air conditioning operations, condensate collecting on the cooper surfaces reacts with the copper to generate cupric ions that disperse in the condensate to inhibit biological growth within the heat exchanger passages. Moreover, the carrier electrically, as well as physically, isolated the copper from the aluminum to prevent galvanic coupling that would otherwise produce accelerated corrosion of the heat exchanger.

3 Claims, 1 Drawing Sheet

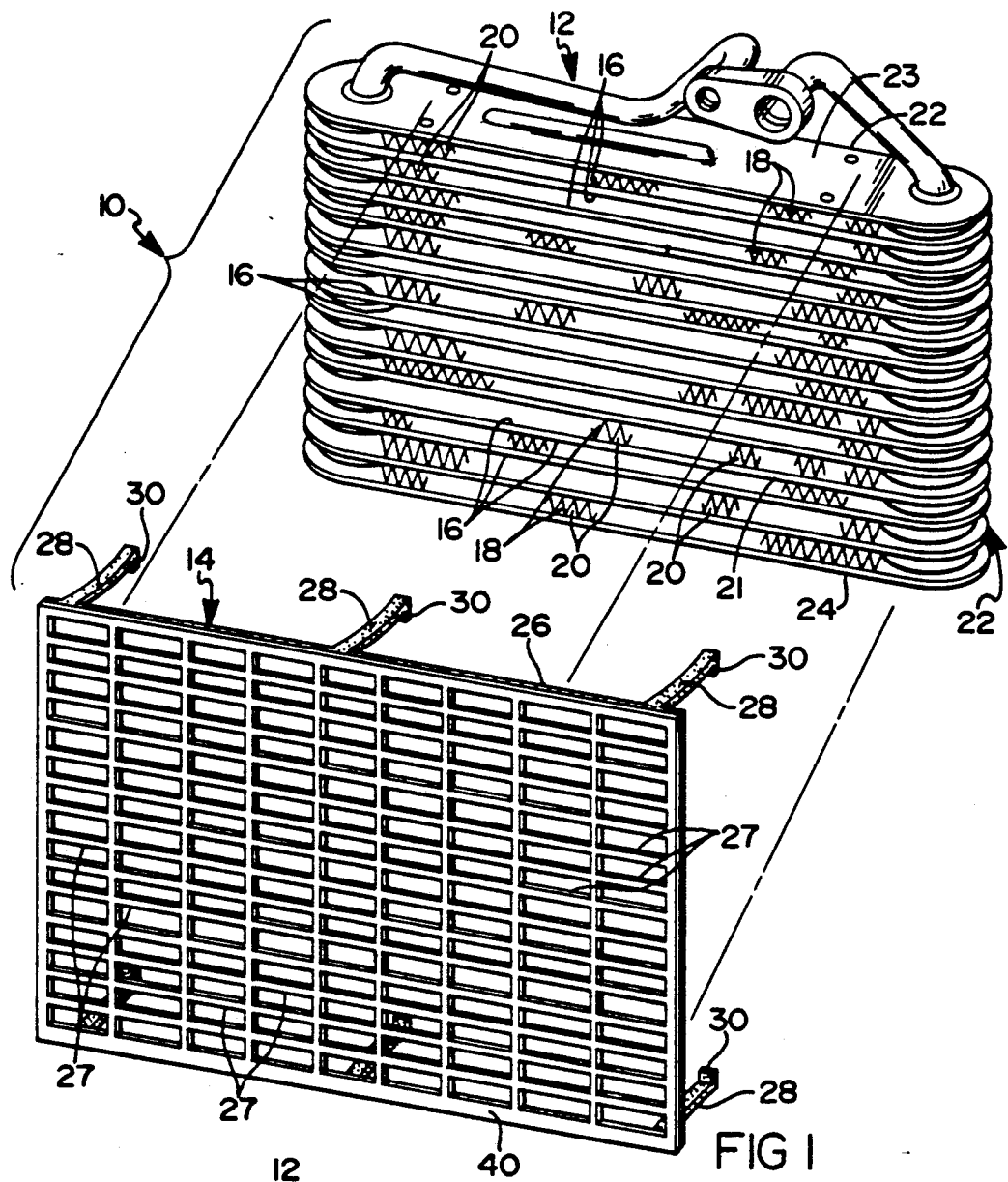
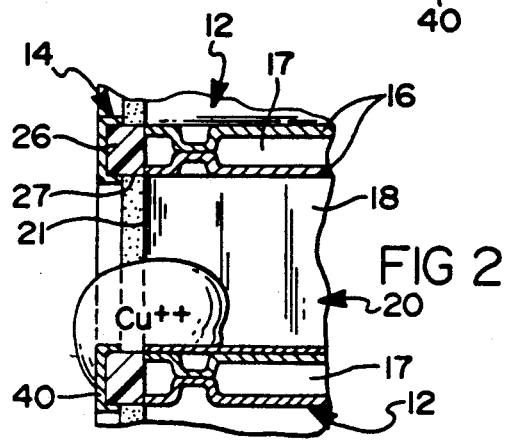
FIG 1
FIG 2

EVAPORATOR CORE HAVING BIOCIDAL FIXTURE

BACKGROUND OF THE INVENTION

This invention relates to an aluminum evaporator core of the type used in an automotive air conditioning system. More particularly, this invention relates to such evaporator core comprising an upstream facade that includes a metallic copper deposit that reacts with condensate to generate cupric ions effective to inhibit biological growth within the core, but which deposit is electrically isolated from aluminum heat transfer surfaces to avoid accelerated corrosion thereof.

In a typical automotive air conditioning system, refrigerant is circulated through an evaporator core located at the front of the passenger compartment to cool air en route to the compartment. The evaporator core has a plate-and-fin construction formed of a stack of elements individually stamped from aluminum alloy sheet stock and brazed into an integral structure. Aluminum alloy is preferred because it has low specific gravity and high thermal transfer properties, and also because the evaporator may be fashioned from readily available sheet stock by convenient operations such as stamping and brazing.

The plate-and-fin design of the evaporator core provides numerous air passages for maximum contact with heat exchanger surfaces. During air conditioning operation, moisture tends to condense within the air passages of the evaporator core and promote the growth of bacteria or fungi, which, if excessive, may produce an unpleasant odor or otherwise affect passenger comfort. U.S. Ser. No. 360,681, filed by J. Siak et al, describes an aluminum evaporator core coated with a metallic copper plate to inhibit microbial growth. Condensate collecting in the air passages tends to be slightly acidic and reacts with the copper to produce cupric ions. The cupric ions, in turn, dissolve in the condensate and inhibit biological growth. The copper reaction with the condensate is slow. Further, only very low concentrations of cupric ions are effective to inhibit microbial growth. As a result, a thin plate may protect the evaporator for an extended time.

A potential corrosion problem arises where the substrate aluminum becomes exposed in physical and electrical contact with the copper plate. In the presence of an electrolyte such as the condensate, the exposed aluminum and the copper coating form a galvanic cell. This redox coupling enhances oxidation of the aluminum, which is evidenced by accelerated corrosion of the evaporator core. The evaporator described in the aforementioned patent application includes a zinc layer intermediate the copper plate and the aluminum substrate. In regions where the copper becomes eroded, the zinc layer provides a barrier to protect the underlying aluminum from contact with the condensate. Nevertheless, it is desirable to develop a system to deliver biocidal cupric ions generated by in-situ copper reaction while preventing a copper-aluminum galvanic coupling that would accelerate corrosion of the evaporator core.

Therefore, it is an object of this invention to provide an aluminum evaporator core for an automotive air conditioning system or the like which includes a copper plate for reaction with condensate to generate biocidal cupric ions, and further wherein the plate is physically and electrically isolated from the aluminum to avoid galvanic coupling of the type that would otherwise result in accelerated corrosion of the evaporator core, but is nevertheless strategically located to disperse the ions over evaporator core surfaces, including within air passages therein, so as to inhibit microbial growth.

SUMMARY OF THE INVENTION

In accordance with a preferred embodiment, this object and others is accomplished by an automotive air conditioner core that includes an aluminum heat exchange structure and a partially copper-plated fixture that attaches to the structure for dispersing cupric ions to inhibit microbial growth. The heat exchange structure preferably is a conventional brazed construction formed of stamped aluminum sheet elements, and having numerous air passages extending between major faces, one of which is intended to face upstream for admitting air after the evaporator core is installed onboard an automotive vehicle. In accordance with this invention, the fixture attaches to the evaporator core adjacent the upstream face and has air passages that register with the air passages of the heat exchange structure for continuous air flow through the core. The fixture is formed of an electrically nonconductive polymer and carries a metallic copper plate on selected surfaces that are spaced apart from the aluminum structure. Thus, the plate is physically separated from the aluminum by the fixture, which, being formed of a nonconductive polymer, electrically isolates the copper from the aluminum.

During air conditioning operations, moisture in air cooled by the core condenses and, because of dissolved sulfur oxides, nitrogen oxides and other pollutants, tends to be slightly acidic. This condensate collects on surfaces in the evaporator core, including the fixture that is cooled through contact with the heat exchange structure. On the copper-plated surface, the condensate reacts with the copper to generate cupric ions. The cupric ions dissolve in the condensate and migrate into the air passages, assisted by the air flow. Even in very low concentrations, the cupric ions are effective to inhibit biological growth within the evaporator core.

Thus, the evaporator core having the biocidal fixture of this invention prevents electrical connection between the aluminum of the heat exchange structure and the copper plate to avoid formation of a galvanic cell of the type that would otherwise result in accelerated corrosion of the heat exchange structure. Moreover, the fixture generates cupric ions by condensate reaction with the copper plate and disperses the ions along air passages of the evaporator core in a manner effective to inhibit biological growth. The slow copper reaction and the low concentrations of ions that is required permits the fixture to remain effective for a long time. In one aspect of this invention, the fixture is replaceable without necessitating removal of the heat exchange structure from the air conditioning system to provide renewed protection against microbial growth.

DESCRIPTION OF THE DRAWINGS

The present invention will be further illustrated with reference to the drawings wherein:

FIG. 1 is an exploded perspective view of an evaporator core having a biocidal fixture in accordance with this invention; and FIG. 2 is a cross-sectional view of a portion of the evaporator core in FIG. 1.

DETAILED DESCRIPTION OF THE INVENTION

Referring to the Figures, in a preferred embodiment, an automotive air conditioner evaporator core 10 of this invention comprises a heat exchange unit 12 and a biocidal fixture 14. Heat exchanger 12 is a brazed aluminum sheet device of the type known in the art for mounting onboard an automotive vehicle for cooling an air stream caused to flow therethrough. Heat exchanger 12 comprises plates 16 arranged in pairs and defining passages 17 through which a liquid coolant is circulated during operation. The pairs of plates 16 are spaced apart by fins 18 that define a multitude of air passages 20 for guiding air between an upstream face 21 and a downstream face 22. Plates 16 and fins 18 are individually stamped from aluminum sheet stock having a braze alloy cladding. To form heat exchanger 12, plates 16 and fins 18 are assembled in a stack between end plates 23 and 24 and vacuum brazed into an integral structure. It is within air passages 20 that heretofore, under normal operating conditions comprising high humidity and cool temperature, bacteria or fungi tend to grow, assisted by condensate, and adversely affect the quality of air treated by air conditioner core 10.

To overcome this problem, this invention provides a fixture 14 for generating biocidal cupric ions and dispersing them within air passages 20 of heat exchanger 12. Fixture 14 is attached to heat exchanger 12 to lie tightly against upstream face 21. Fixture 14 comprises an insulating polymeric carrier 26 that defines openings 27 that register with heat exchange passages 20 to provide a continuous air flow path through air conditioner core 10. It is desirable to minimize the frontal area of carrier 26 to minimize interference of air flow into heat exchanger 12. Fixture 14 is attached to heat exchange unit 12 by straps 28 that overlie ends 23 and 24 and have tabs 30 that hook against downstream face 22 to secure fixture 14 to heat exchanger 12. Fixture 14 is formed of an injection-molded polymer that is substantially nonconductive of electricity. In this example, a preferred polymer is acrylonitrile-butadiene-styrene (ABS). Fixture 14 further comprises a copper plate 40 deposited on selected surfaces of carrier 26 such that plate 40 extends along the frontal surface and partially along passages 27, as shown in FIG. 2. Significantly, plate 40 is applied to surfaces that are spaced apart from heat exchange unit 12 so as to prevent direct physical contact therebetween of the type that might otherwise permit electrical communication between the copper and the aluminum.

A suitable process for applying copper 40 to ABS carrier 26 involves electroless deposition comprising the following steps.

(1) The injection molded ABS carrier is conditioned by immersion in an aqueous chromic acid solution at about 34° C. The concentration of chromic acid is about 900 grams per liter. The body is immersed for between one and five minutes to etch the surface for enhanced metal-to-plastic adhesion, and thereafter is thoroughly rinsed in water.

(2) The etched ABS surface is sensitized by immersion in an aqueous solution containing 20 grams per liter stannous chloride and 40 ml per liter of concentrated hydrochloric acid. The body is immersed in the solution at a temperature of between about 20° C. and 25° C. for between one and three minutes.

(3) The sensitized ABS surface is nucleated to absorb a catalytic palladium material. To this end, the sensitized surface bearing the stannous ions is immersed in an aqueous solution comprising 0.25 grams per liter palladium chloride and 2.5 ml per liter of concentrated hydrochloric acid. The polymer is immersed for between about 30 and 60 seconds in the solution at a temperature of 20° C. to 40° C. During this treatment, stannous ions absorbed during sensitization react with palladium ions in solution to deposit palladium metal and form the necessary catalytic sites.

(4) Following nucleation, the ABS carrier is immersed in electroless copper plating solution. A preferred solution comprises 3.6 grams per liter copper sulfate, 25.0 grams per liter sodium potassium tartrate, 3.8 grams per liter sodium hydroxide and 10.0 grams per liter formaldehyde in water. During immersion, copper ions react with formaldehyde in the presence of palladium catalyst to deposit a continuous copper metal plate.

The formation of copper plate 40 is limited to surfaces of carrier 26 that are not intended to directly contact the heat exchanger 12. This may be accomplished by partially immersing carrier 26 in one or more of the treating solutions so as only to treat the selected surfaces. Alternately, the surfaces intended to lie adjacent unit 12 may be masked or photochemically treated to prevent copper deposition. In still another alternative, copper metal may be plated onto all surfaces of fixture 14 and the unwanted copper physically removed.

Following deposition of copper plate 40 onto carrier 26, fixture 14 is attached to heat exchange unit 12, secured by straps 28. The assembled evaporator core 10 is then ready for installation and operation onboard an automotive vehicle. During air conditioning operations, coolant is caused to flow through passages 27 and to extract heat from air flowing through passages 20. As cooling continues, moisture within the air tends to condense onto the surfaces of evaporator core 10, including the surfaces of fixture 14. This condensate tends to be slightly acidic as a result of sulfur oxides and other species in the air. The condensate reacts with the metallic copper to produce cupric ions. Under dry conditions, the reaction products, primarily oxides or sulfates of copper, are readily observable as a green patina on the copper plate. In the presence of the condensate, the copper salt dissolves and migrates through passages 20, assisted by air flow through core 10, whereupon the copper ions inhibit growth of bacteria and fungi within air passages 20.

One advantage of this invention is that the reaction between the copper plate and the condensate, while satisfactory to produce cupric ions in amounts sufficient to produce the desired biocidal effect, is nonetheless slow as to generate ions over an extended time suitable for use on board an automotive vehicle.

While the plate in the described embodiment was formed by electroless copper deposition, suitable copper plates may be formed by other techniques including vacuum sputtering. Also, the thickness of the plate may be increased by electroplating copper onto the base plate to further extend the useful life of the fixture. In the described embodiment, the fixture was attached to the heat exchanger by straps. The straps may be readily uncoupled to detach the fixture for replacement. This may be advantageously carried out on board the vehicle without disconnecting or removing the heat exchanger from the air conditioner system. The fixture may be attached to the heat exchanger by other suitable means that prevent electrical contact between the aluminum and the copper plate, for example, using polymeric bolts.

In the described embodiment, the fixture is formed mainly of an injection-molded ABS polymer. The polymer is substantially electrically nonconductive and thus not only physically separates, but also electrically isolates the copper plate from the aluminum structure. In this manner, the flow of electrical current between the copper and the aluminum is interrupted to prevent an electrochemical cell that would otherwise lead to accelerated corrosion of the aluminum. At the same time, the copper metal is strategically located to react with condensate and to disperse the resulting biocidal cupric ions within the air passages. While the fixture in the described embodiment was formed of ABS, it may be suitably formed of other nonconductive polymers, such as polypropylene, polycarbonate, polyacetal or other moldable engineering grade plastics.

While this invention has been described in terms of certain embodiments thereof, it will be appreciated that other forms could be readily adapted by those skilled in the art. Accordingly, the scope of the invention is to be considered limited only by the following claims.

The embodiments of the invention in which an exclusive property or privilege is claimed are defined as follows:

1. An evaporator core for use in an air conditioning system to cool air caused to flow therethrough, said evaporator core comprising a heat exchange unit comprising an upstream face and having a plurality of air passages extending from the upstream face for conveying air therethrough, said heat exchange structure being formed of aluminum alloy that defines said passages in heat transfer relationship with air caused to flow therethrough, and a fixture adjacent the heat exchange structure upstream face and having air passages in registration with the air passages of the structure, said fixture being formed of an electrically insulative material and bearing a metallic copper clad spaced from said aluminum structure in electrical isolation therefrom, whereupon condensate collecting on the copper clad reacts with the metal to form copper ions that dissolve in the condensate and migrate into the air passages within the heat exchange structure to inhibit biological growth therein.

2. An evaporator core for use in an automotive air conditioning system to cool air en route to a passenger compartment of an automotive vehicle, said evaporator core comprising a heat exchanger unit comprising a plurality of plates and fins stamped from aluminum alloy sheet stock and brazed into an integral structure, said heat exchange unit comprising an upstream face and having a plurality of air passages extending from the upstream face for conveying air therethrough in heat transfer relationship with said plates and fins, and a fixture attached to the heat exchange unit to lie against the upstream face thereof and having air passages in registration with the heat exchanger air passages, said fixture comprising an electrically insulative polymeric carrier and a metallic copper clad deposited on selected surfaces of said carrier spaced from said aluminum heat exchanger so as to be electrically isolated therefrom, whereupon condensate collecting on the copper clad reacts with the metal to form copper ions that dissolve in the condensate and migrate into the air passages within the heat exchange structure to inhibit biological growth therein.

3. An evaporator core in claim 2 wherein the fixture includes straps that extend about the heat exchanger unit to secure the fixture to the unit.

* * * * *